US010455508B2

(12) United States Patent
Chen et al.

(10) Patent No.: US 10,455,508 B2
(45) Date of Patent: Oct. 22, 2019

(54) METHOD AND DEVICE FOR MONITORING PAGING SIGNAL (71) Applicants: Li Chen, Beijing (CN); Chia-Chun Hsu, New Taipei (TW); Yuanyuan Zhang, Beijing (CN)

(72) Inventors: Li Chen, Beijing (CN); Chia-Chun Hsu, New Taipei (TW); Yuanyuan Zhang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 168 days.

(21) Appl. No.: 14/778,706

(22) PCT Filed: Apr. 3, 2014

(86) PCT No.: PCT/CN2014/074737
§ 371 (c)(1),
(2) Date: Sep. 21, 2015

(87) PCT Pub. No.: WO2014/161503
PCT Pub. Date: Oct. 9, 2014

(65) Prior Publication Data
US 2016/0050626 A1   Feb. 18, 2016

(30) Foreign Application Priority Data

Apr. 3, 2013  (CN) .......................... 2013 1 0115824

(51) Int. Cl.
*H04W 52/02*  (2009.01)
*H04W 68/02*  (2009.01)
(Continued)

(52) U.S. Cl.
CPC ....... *H04W 52/0225* (2013.01); *H04W 68/02* (2013.01); *H04W 76/28* (2018.02);
(Continued)

(58) Field of Classification Search
None
See application file for complete search history.

(56) References Cited

U.S. PATENT DOCUMENTS

2004/0029596 A1* 2/2004 Kim ...................... H04L 12/189
                                                         455/458
2010/0248752 A1* 9/2010 Yu .......................... H04W 68/02
                                                         455/458
(Continued)

FOREIGN PATENT DOCUMENTS

CN    102217408 A    10/2011
CN    102792611 A    11/2012
(Continued)

OTHER PUBLICATIONS

International Search Report dated Jun. 3, 2014, issued in application No. PCT/CN2014/074737.
(Continued)

*Primary Examiner* — Huy D Vu
*Assistant Examiner* — Bao G Nguyen
(74) *Attorney, Agent, or Firm* — McClure, Qualey & Rodack, LLP (57) ABSTRACT A method and device for monitoring paging signals are provided. A method of DRX cycle extension for a mobile terminal in an IDLE mode is provided. The method is used to extend the current DRX cycle. A longer paging cycle is designed by extending a UE-specific paging cycle or introducing a new coefficient in system information. A method for extending the SFN is proposed in the invention. A boundary and a serial number of the SFN in the longer wrap around are indicated by the SI. To avoid a situation in which the high paging load occurs in certain paging frames or subframes, the UE_ID is extended in the invention. The proposed mechanism can flexibly adjust the paging cycle and the SFN extension to meet the actual requirements. The
(Continued)

long DRX cycle can save a lot of power consumption of the mobile terminals in the IDLE mode.

13 Claims, 8 Drawing Sheets

(51) Int. Cl.
    *H04W 76/28*     (2018.01)
    *H04W 88/02*     (2009.01)

(52) U.S. Cl.
    CPC .............. *H04W 88/02* (2013.01); *Y02D 70/00* (2018.01); *Y02D 70/21* (2018.01); *Y02D 70/24* (2018.01)

(56) References Cited

U.S. PATENT DOCUMENTS

| | | |
|---|---|---|
| 2012/0300685 A1 | 11/2012 | Kim et al. |
| 2015/0043455 A1* | 2/2015 | Miklos .................... H04W 8/26 370/329 |
| 2015/0215989 A1* | 7/2015 | Bangolae .......... H04W 52/0251 370/311 |
| 2015/0304986 A1* | 10/2015 | Eriksson ................ H04W 68/00 455/458 |
| 2015/0341978 A1* | 11/2015 | Rune ...................... H04W 48/12 370/254 |
| 2016/0192434 A1* | 6/2016 | Du .................... H04W 52/0216 370/329 |

FOREIGN PATENT DOCUMENTS

| | | |
|---|---|---|
| CN | 102917444 A | 2/2013 |
| CN | 102970750 | 3/2013 |
| WO | 2011/087233 A2 | 7/2011 |
| WO | 2012/055545 A1 | 5/2012 |
| WO | 2013/031152 A1 | 3/2013 |

OTHER PUBLICATIONS

"3rd Generation Partnership Project (3GPP);Technical Specification Group (TSG) Radio Access Network; Working Group 2; 3GPP TS 25.304: UE procedures in Idle Mode; V1.6.0;" Oct. 1999; pp. 1-40.

"Introduction of longer SFN length for MTC;" 3GPP TSG RAN WG2 #68bis; Jan. 2010; pp. 1-2.

* cited by examiner

METHOD AND DEVICE FOR MONITORING PAGING SIGNAL

PRIORITY INFORMATION

This application is a National Phase Application of PCT Application no. PCT/CN2014/074737, filed on Apr. 3, 2014, which claims priority to Chinese Application No. 201310115824.9, filed on Apr. 3, 2013, which are incorporated herein by reference in their entireties.

BACKGROUND OF THE INVENTION

Field of the Invention

Aspects of the present invention relate generally to mobile communications, and more particularly, to methods and devices for DRX paging cycle extension of user equipment (UE) in IDLE mode.

Description of the Related Art

To receive paging messages from an evolved universal terrestrial radio access network (E-UTRAN), the user equipment (UE) in an IDLE mode monitors the physical downlink control channel (PDCCH) for using a Paging Radio Network Temporary Identifier (P-RNTI) to indicate paging. The UE only needs to monitor the PDCCH channel at certain UE-specific occasions, i.e., at specific subframes within specific frames. At other times, the UE may apply discontinuous reception (DRX) not to listen to the paging messages, meaning that the UE can turn off its receiver to save battery power.

Each cell broadcasts a default paging cycle, so that the E-URTAN can configure the radio frames and subframes used for paging. In addition, upper layers may use dedicated signaling to configure a UE-specific paging cycle. If the default paging cycle and the UE-specific paging cycle are both configured, the UE applies the lowest value of the above two as the paging cycle. The UE would calculate a radio frame (a Paging Frame (PF)) and a subframe within that PF (a paging occasion (PO)), which E-URTAN uses to page the UE. One Paging Occasion (PO) is a subframe, which is an occasion of the P-RNTI transmitted on the PDCCH used to send the paging message. One Paging Frame (PF) is a Radio Frame, which may comprise one or multiple paging occasions. When the DRX is used, the UE only needs to monitor one PO for itself per DRX cycle.

The PF and PO are determined by using the DRX parameters provided in System Information (SI) and the following equation, wherein the PF is given by following equation:

$$\text{SFN Mod } T = (T \text{ div } N)*(UE\_ID \text{ Mod } N). \quad (1)$$

Wherein Mod represents modulo operation and div represents division operation. T represents the paging cycle, and UE_ID represents the ID of the UE (i.e., a terminal identification). N=min(T, nB), wherein nB represents the number of paging subframes per frame*T.

The index i_s can be derived from the following equation:

$$i\_s = \text{floor}(UE\_ID/N) \text{ mod } Ns. \quad (2)$$

Wherein floor represents a floor function returning an integer portion of a number, and Ns=max(1, nB/T). The PO can be obtained from the following mapping relationship according to i_s and the parameter Ns, which may be found in TABLE 1 and TABLE 2. TABLE 2 shows that the parameters can be applied to all TDD UL/DL configurations:

TABLE 1 the corresponding relationship among PO, i_s and Ns in FDD mode

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2 the corresponding relationship among PO, i_s and Ns in TDD mode

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

Once DRX parameter values are changed in the SI, the DRX parameters stored in the SI shall be updated locally in the UE. If the UE has no international mobile subscriber identity (IMSI). For example, when the UE makes an emergency call without using the universal subscriber identity module (USIM), the UE may use the default identity UE_ID=0 in the equation (2) described above.

The following parameters are used to calculate PF and i_s. T is the DRX cycle of the UE, and T is determined by the minimum value between the UE specific DRX cycle value (obtained through the upper layer configuration) and the default DRX cycle value (obtained by broadcasting the SI). If the UE specific DRX cycle is not configured by the upper layer, the default DRX cycle value is used. nB is one of the set {4T, 2T, T, T/2, T/4, T/8, T/16, T/32}. N=min(T, nB), Ns=max(1, nB/T), UE_ID=IMSI mod 1024. IMSI is given as an integer sequence of 10 digits. IMSI may be a decimal integer in the equation described above, wherein the first digit given in the integer sequence represents the highest order digit. For example: IMSI=12 (digit1=1, digit2=2).

However, for UEs of certain traffics, such as machine type communication (MTC) UE, due to the traffic characteristics with small packets and small amount of data, there is no need to monitor PDCCH under the current mechanism. Since there is not so much data needed to interact with the eNB in real-time, the mobile terminals need low power consumption. However, the mobile terminals are generally in an IDLE mode most of the time. Thus, there is a need for power saving schemes for mobile terminals in the IDLE mode.

BRIEF SUMMARY OF THE INVENTION

Methods and devices of monitoring paging signals are provided.

In a preferred embodiment, the invention is directed to a method for monitoring paging signals for a terminal in an IDLE mode, comprising: extending a system frame number (SFN) cycle according to a coefficient for extension of the SFN; calculating paging locations according to the extended SFN cycle; and monitoring paging signals on the paging locations.

In another embodiment, the invention is directed to a method for monitoring paging signals for a terminal in an IDLE mode, comprising: obtaining a serial number of a system frame number (SFN) according to system information; obtaining an SFN boundary according to the system information; calculating paging locations according to the serial number of the SFN and the SFN boundary; and monitoring paging signals on the paging locations.

In yet another embodiment, the invention is directed to a device for monitoring paging signals for a terminal in an IDLE mode, comprising: a calculation module, calculating a system frame number (SFN) cycle according to a coefficient for extension of the SFN, and calculating paging locations according to the extended SFN cycle; and a paging processing module, monitoring paging signals on the paging locations.

The method and the device for monitoring paging signals provided in the invention can flexibly adjust the paging cycle and the extension level of the SFN to achieve the actual needs and thereby reduce a lot of power consumption of the mobile terminals in the IDLE mode.

DETAILED DESCRIPTION OF THE INVENTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Due to the characteristics of machine type communication (MTC), the existing mechanism for discontinuous reception (DRX) cycle design is not efficient enough in the scenarios with the MTC user equipment (UE). A mechanism of DRX cycle extension in the IDLE mode for the mobile terminals is proposed in the invention. The mechanism extends the current DRX cycle design. A much longer paging cycle is designed by extending the UE-specific paging cycle or introducing a new coefficient in system information (SI). The extension methods for system frame number (SFN) range are proposed in another embodiment of this invention since the paging cycle is restricted by the wrap-around length of the SFN. Meanwhile, the boundary and the serial number of the SFN in the longer wrap around are indicated by the SI. In order to avoid a situation in which the high paging load occurs in certain paging frames or subframes, the identity of the mobile terminal (UE_ID) is extended in one embodiment of the invention. The mechanism proposed in the invention can flexibly adjust the paging cycle extension and the SFN extension to meet the actual requirements. The long DRX cycle designed in the invention can save a lot of power of the mobile terminals in the IDLE mode. Paging, which is the activity that consumes the most power while in the IDLE mode, should be designed to satisfy the requirement of saving power. Since the DRX is used to reduce power consumption in the IDLE mode, an efficient method for achieving the purpose is to design a much longer DRX cycle. Therefore, a method and a device using a much longer DRX cycle is proposed in the invention, illustrating a method and a device for paging cycle extension.

Figure 1:
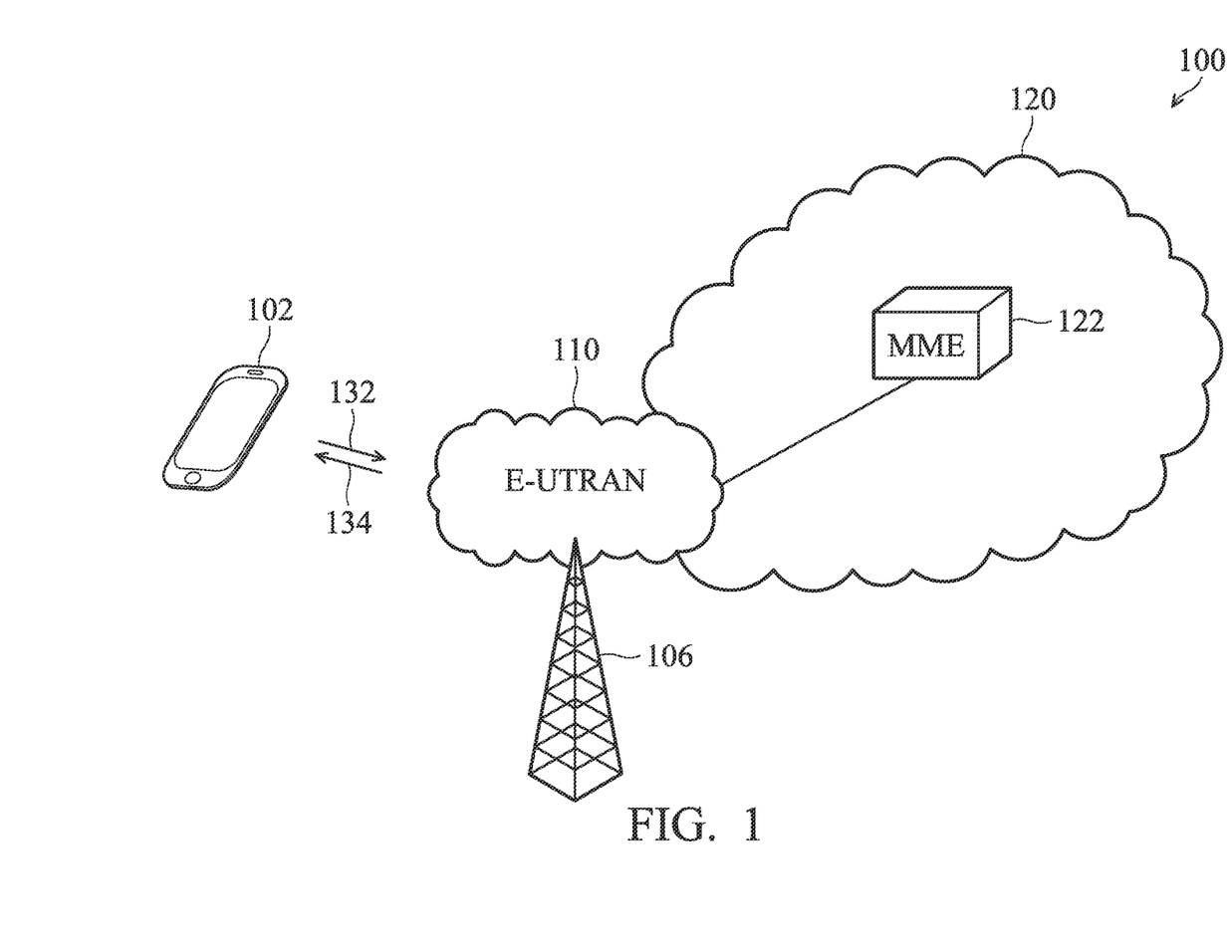
FIG. 1 is a schematic diagram illustrating a wireless communications system according to an embodiment of the present invention.

FIG. 1 is a schematic diagram illustrating a wireless communications system 100 according to an embodiment of the present invention. The wireless communications system 100 comprises a user equipment (UE) 102, an evolved universal terrestrial radio access, E-UTRAN) 110 and an evolved packet core (EPC) 120. The EUTRAN 110 comprises one or more evolved Node B (eNBs) 106, and the EPC 120 comprises at least one mobility management entity (MME) 122.

The MME 122 is a node of the EPC 120, used to manage mobility and session states for the UEs. The MME 122 is configured to perform authentication and authorization functions, non-access stratum (NAS) signaling transmission, security negotiations, serving gateway and/or PGW selection, and UE reachability.

The UE 102 is in communication with an antenna group (not shown in FIG. 1) of the eNB 106, wherein the antenna group transmits information to the UE 102 over downlink 134 and receive information from the UE 102 over uplink 132.

Figure 2A:
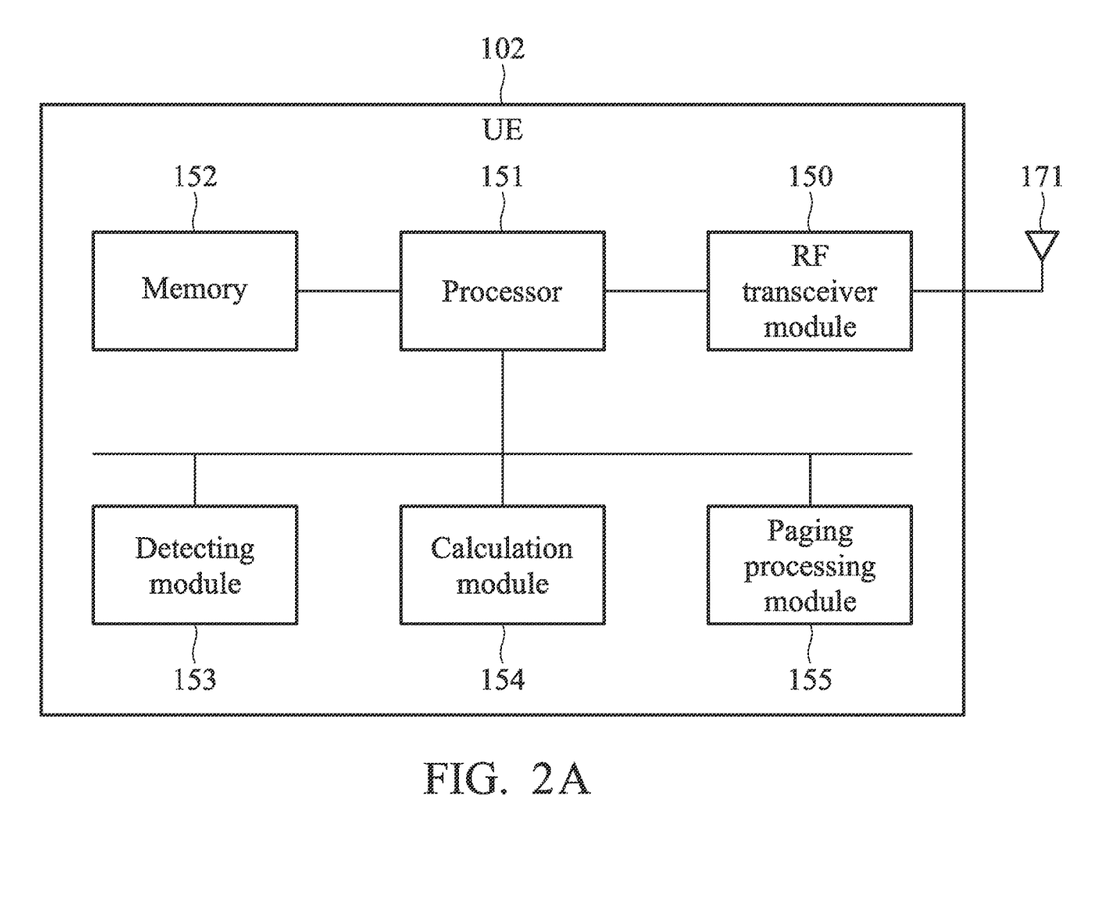
FIGS. 2A and 2B are further block diagrams illustrating the eNB and the UE according to an embodiment of the present invention.
Figure 2B:
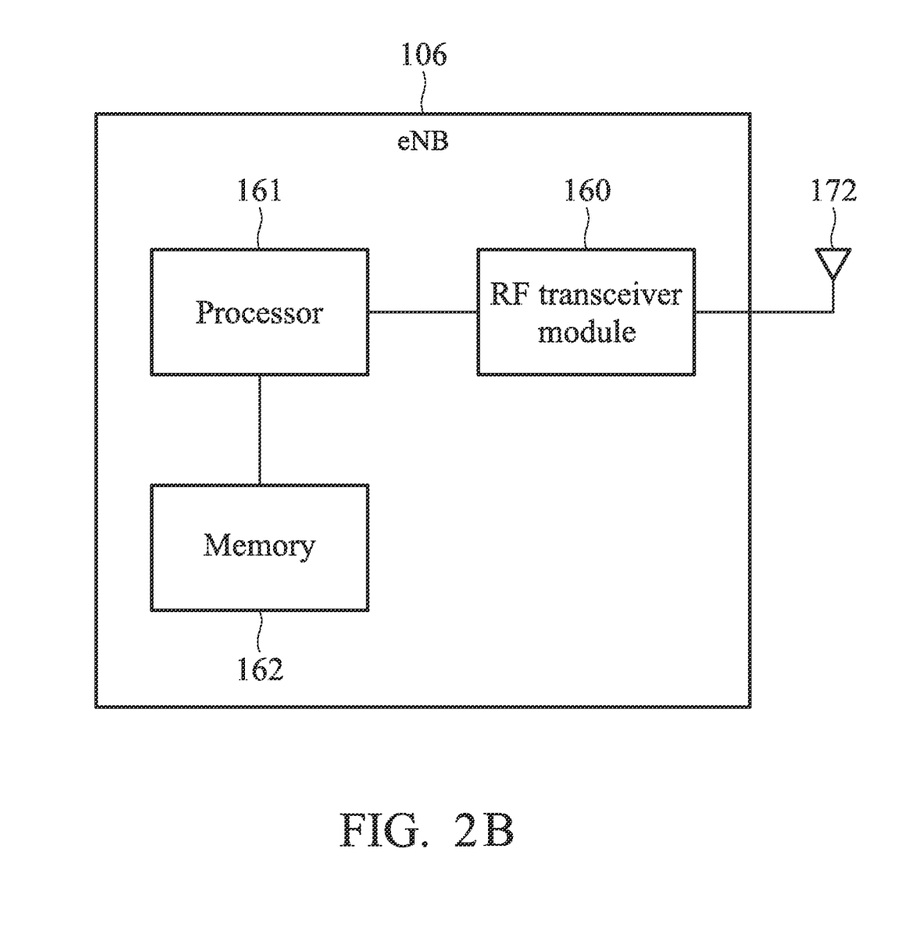

The eNB 106 may be a fixed base station or a base station used to communicate with the terminal devices, and may also be called an access point, an access network (AN), a base station, an evolved base station, or other terminology. The UE 102 may also be called an access terminal (AT), a wireless communication device, a terminal, or other terminology. The UE 102 has a physical layer (PHY), a MAC layer (MAC), a radio link control (RLC) layer, a packet data control protocol (PDCP) layer and a radio resource control (RRC) stack. The peer protocol stacks in the eNB 106 comprise the PHY, MAC, RLC, PDCP, and RRC and so on. FIGS. 2A and 2B are further block diagrams illustrating the UE 102 and the eNB 106 according to an embodiment of the present invention.

The UE 102 comprises an RF transceiver module 150, wherein the RF transceiver module 150 is coupled to an antenna 171 for receiving radio signals from the antenna 171, and then converts them into baseband signals and sends to the processor 151. The RF transceiver module 150 also converts baseband signals from the processor 151 into RF signals and transmits the RF signals to the antenna 171. The processor 151 processes the received baseband signals and triggers different functional modules of the UE 102 to implement the corresponding functions. A memory 152 stores instructions of the operation and data controlling the UE 102. FIG. 2A further shows several functional modules in the UE 102, for example, a detecting module 153 and a paging processing module 155, wherein the detecting module 153 detects the system information, for example, the SFN expansion coefficient. A calculation module 154 is used to calculate the SFN cycle and the SFN cycle boundary, alternatively, the calculation module 154 may further be used to calculate the paging locations (e.g., the paging occasion) according to the extended SFN cycle. The paging processing module 155 is used to monitor specific paging signals in a specific paging cycle and paging occasions and generates coefficients related to the paging cycle and the SFN extension, or directly generates the extended paging cycle, etc.

The eNB 106 has an RF transceiver module 160 which is coupled to an antenna 172, the RF transceiver module 160 is used to receive RF signals from the antenna 172 and convert the RF signals to baseband signals and send the baseband signals to the processor 161. The RF transceiver module 160 also receives the baseband signals from the processor 161 and converts the baseband signals into the RF signals, and transmits the RF signals to the antenna 172. The processor 161 processes the received baseband signals and triggers different functional modules of the eNB 106 to implement the corresponding functions. The memory 162 stores instructions of the operation and data controlling the eNB 106. The function modules in the eNB 106 will not be repeated here, for brevity.

For mobile terminals having some special traffic, such as the MTC, the packets are scattered sparsely. Besides, the packets for the traffic are small, so can be transmitted based on a long duty cycle, such as metering devices. Since the mobile terminals are in IDLE mode most of the time, the mobile terminal (such as the UE) needs to wake up too frequently if the mobile terminal monitors the paging message according to the current mechanism, and the power of the mobile terminal is wasted because no data need to be transmitted by the mobile terminals most of the time. Therefore, the current paging cycle is not long enough for the mobile terminals having the above traffic. Low power consumption is an important requirement for these applications. Sometimes, the low power consumption is an important factors. Paging, which is the activity that consumes the most power while in the IDLE mode, should be improved to satisfy the requirements of saving power for some applications. For the applications, observations show that the mobile terminals do not need to exchange messages with the network in a shorter cycle frequently, or the delay tolerance for the mobile terminals may be not high. Thus, extending the DRX cycle is an efficient and simple method to satisfy the mobile terminals having the special traffic. One of the purposes of the invention is to design the paging cycle to save power consumption for the mobile terminal.

That how long the length of the DRX cycle extension is for the mobile terminals is restricted by the wrap around length of the SFN. The wrap around length of the current SFN is not enough for the extended paging cycle. Thus, with the paging cycle extension, the wrap around length of the SFN should be extended. Meanwhile, in order to calculate the location of the paging signal, the serial number of the SFN in the wrap around cycle could be synchronized between the mobile terminal and the network. After performing the wrap around length extension of the SFN, the boundary of the SFN wrap around cycle length cannot be aligned between the mobile terminal and the network. Thus, the boundary of the SFN wrap around cycle length should also be extended to indicate a paging location for the mobile terminal.

In the current mechanism, the UE_ID has the length of 10 bits, which means that there are 1024 mobile terminal groups. After the paging cycle extension, the current number of mobile terminal group is not enough to be normally distributed in the paging cycle. The current number of mobile terminal group will cause the problem of high paging load in some paging frames in the paging cycle. Thus, the current number of mobile terminal group should be extended to adapt the paging cycle extension, i.e., the UE_ID of the mobile terminals should be extended.

In order to resolve the problems described above, a method for designing the DRX cycle is proposed in one embodiment of the invention to save power for the UEs having some specific traffic, such as MTC UEs. Using the MTC UEs as an example, the packets are sparsely distributed and the delay budget is loose. The proposed method can extend the paging cycle greatly, so that the power consumption for the MTC UEs in the IDLE mode would be reduced.

Paging Cycle Extension

The first embodiment of the present invention is related to the paging cycle extension. In the current mechanism, the paging cycle T is determined according to the minimum cycle between the UE-specific paging cycle and the cell-specific default paging cycle, wherein the UE-specific paging cycle is allocated by the upper layer and the cell-specific default paging cycle is broadcasted in the SI. Two methods proposed in the invention are used to extend the paging cycle for the MTC devices. In order to be backward compatible, instead of introducing a completely new design, the paging cycle used in the legacy design can be extended. In other words, the new design can extend the paging cycle in the IDLE mode for mobile terminals directly without changing the behaviors (or even SI) of legacy UEs.

In the first method, in order to extend the paging cycle of MTC UEs only, the UE-specific paging cycle should be extended for the MTC UE. Since the cell-specific paging cycle would affect the paging cycle of all UEs (including normal UEs and MTC UEs) in the cell, the cell-specific paging cycle in the SI would not be changed directly. The procedure of the method proposed in the invention is described as follows. The MTC UE generates a new UE-specific paging cycle by the paging processing module, wherein the new UE-specific paging cycle is much longer than the current paging cycle. Then, the UE triggers a Non-Access Stratum (NAS) procedure, and reports the new UE-specific paging cycle to a mobility management entity (MME) by the NAS through a tracking area update (TAU) procedure. Upon receiving the new UE-specific paging cycle, the MME stores it in the UE context. After that, the MME forwards the UE-specific paging cycle used for the MTC UE to the eNB in the tracking area. The difference between the procedure in the invention and the procedure of the existing mechanism is that the paging cycle for the MTC is extended to be longer than the current maximum cycle for the normal UEs. At the network side, the MME generates paging messages for the MTC UEs, and the eNB broadcasts the paging messages based on the longer UE-specific paging cycle. At the UE side, the MTC UE calculates a paging frame and a paging occasion based on the UE-specific paging cycle, and monitors paging signals on the locations. During the procedure, the paging cycle should be synchronized between the UE and the network side to avoid wasting resource or unnecessary errors processing at the network side. Compared with the legacy mechanism, during the procedure that the MTC UE generates the paging signals, the function MIN( ) used for calculating the paging cycle T in the network and the UE is disabled. The paging cycle may be equal to the UE-specific paging cycle. Therefore, if the MME receives a UE request for setting the UE-specific paging cycle, the UE may monitor the paging signals only according to the paging cycle.

Figure 3:
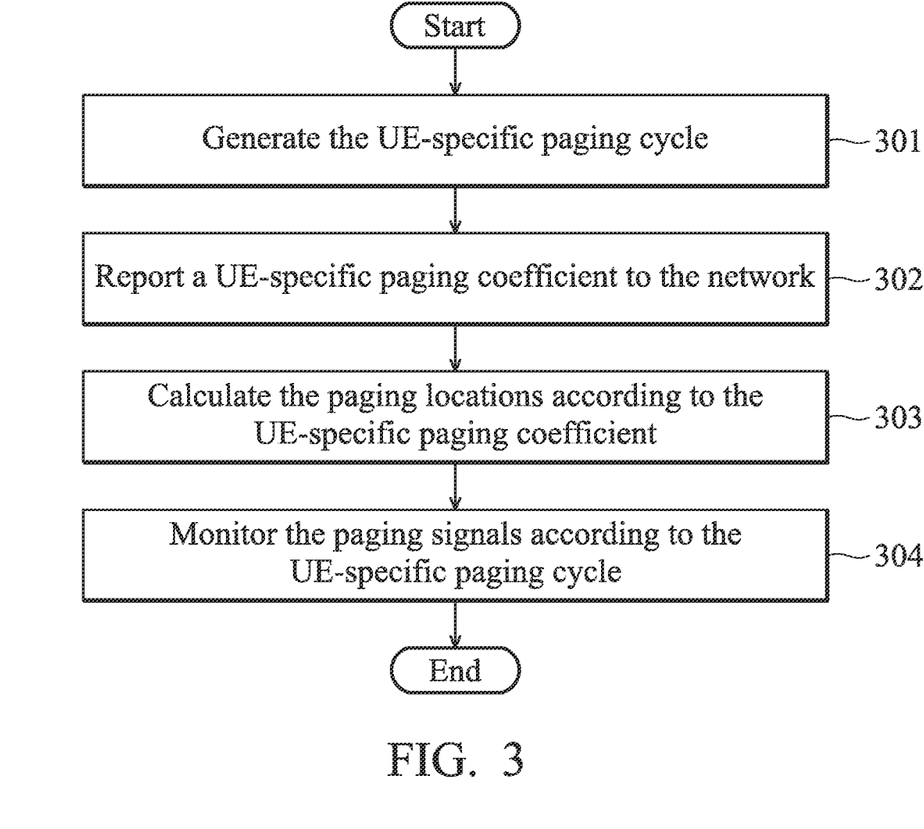
FIG. 3 is a schematic diagram illustrating a procedure of the paging cycle extension performed by the UE according to an embodiment of the present invention.

FIG. 3 is a schematic diagram illustrating a procedure of the paging cycle extension performed by the UE according to an embodiment of the present invention. As shown in FIG. 3, the paging cycle $T=T_{UE\text{-}specific}$, rather than $T=\min(T_{cell\text{-}specific}, T_{UE\text{-}specific})$, is implemented at the network and the mobile terminal during the procedure of generating the paging signals and monitoring the paging signals, respectively. Specifically, referring to FIG. 3, a paging processing module of the UE generates the UE-specific paging cycle (step 301). Then, the UE reports a UE-specific paging coefficient to the network (step 302). After a calculation module of the UE calculates the paging locations according to the UE-specific paging coefficient (step 303), the paging processing module monitors the paging signals according to the UE-specific paging cycle (step 304).

In the second method, the legacy cell-specific paging cycle is extended directly for the MTC UEs to keep backward compatible. A coefficient is assigned to multiply the current cell-specific paging cycle of the normal UEs, wherein the coefficient determines the extension level of the paging cycle for the MTC. The procedure of the method is described as follows. At the network side, according to the UE information in the UE context (such as a UE category), the MME generates a coefficient Ci of the paging cycle extension of the MTC UE i, and forwards the coefficient Ci to the eNB. A new SIB is defined by the network side to indicate the coefficient. Then, the eNB transmits the coefficient in the SI to the MTC UE. At the UE side, the UE detects the SI to obtain the coefficient. The normal UEs can ignore the coefficient, and the MTC UE can use the coefficient to extend the paging cycle. The extended paging cycle for the MTC UE is a cycle multiplied by the cell-specific paging cycle and the coefficient. Then, at the network side, the MME generates the paging message for the MTC UE, and the eNB broadcasts the paging message according to the extended paging cycle. At the UE side, the MTC UE calculates the paging frame and the paging occasion according to the coefficient, and monitors the paging signals on the locations. During the procedure, the paging cycles should be synchronized between the UE side and the network side to avoid wasting resource or unnecessary errors processing at the network side. Compared with the legacy mechanism, during the procedure that the MTC UE generates the paging signals, the function MIN( ) used for calculating the paging cycle T in the network and the UE is disabled. The paging cycle may be equal to a cycle multiplied by the cell-specific paging cycle and the coefficient.

In the second method, the coefficients for different MTC UEs can be the same. The coefficient for the MTC UE can also not be transmitted in the SI, wherein the condition can be pre-defined in the specifications. During the implementation of the paging cycle extension, the coefficient can be written by hardware in the network and the MTC UEs. At the network side, the MME generates a paging message, wherein the paging cycle of the paging message is related to the UE information (such as the UE category). The paging cycle for the normal UEs is calculated according to the current mechanism, and the paging cycle for the MTC UEs is the cell-specific paging cycle multiplied by the coefficient. The MME generates the paging signals, and the eNB broadcasts the paging signals according to the paging cycles for different UEs. At the UE side, the MTC UE calculates the paging frame and the paging occasion according to the predefined coefficient, and monitors paging signals on these locations.

Figure 4:
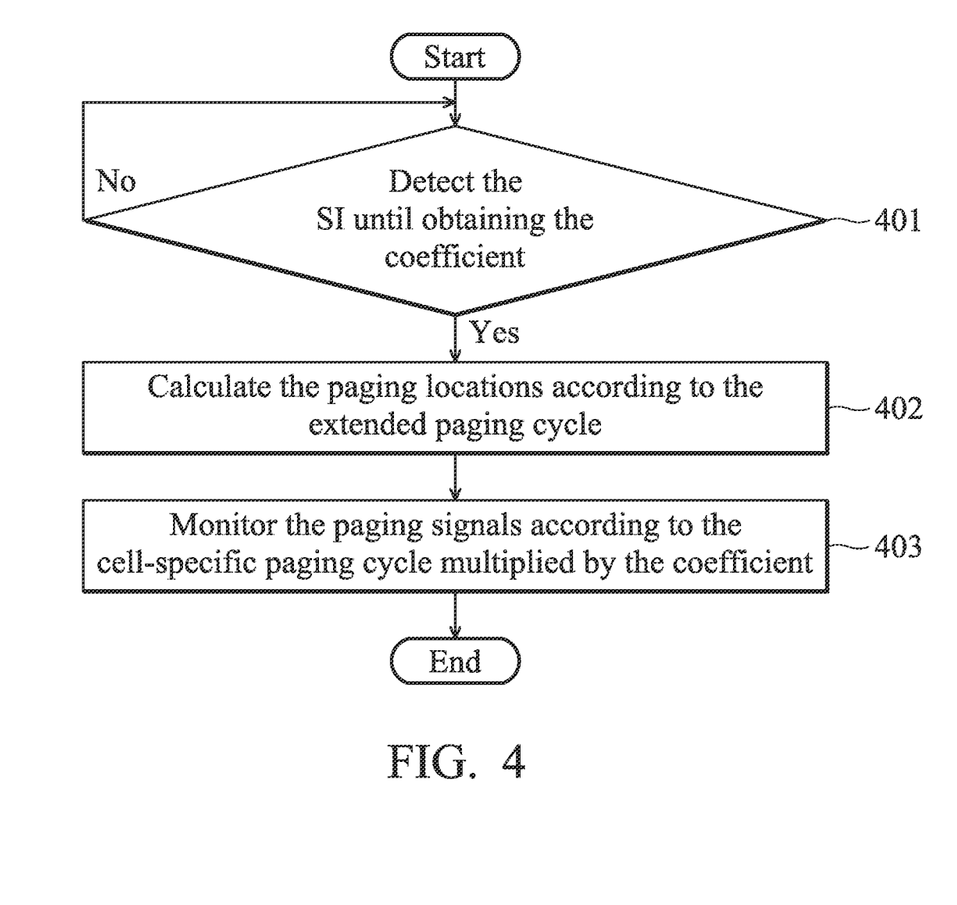
FIG. 4 is a schematic diagram illustrating a procedure of the paging cycle extension performed by the UE according to another embodiment of the present invention.

FIG. 4 is a schematic diagram illustrating a procedure of the paging cycle extension performed by the UE according to another embodiment of the present invention. As shown in FIG. 4, during the procedure, the coefficient C for the paging cycle extension is generated at the network and is transmitted in the SI. The mobile terminals keep detecting the SI until obtaining the coefficient (step 401). Next, the paging cycle $T=C*T_{cell\text{-}specific}$, rather than $T=\min(T_{cell\text{-}specific}, T_{UE\text{-}specific})$, is implemented at the mobile terminal and the network during the procedure of generating the paging signals and monitoring the paging signals, respectively. Specifically, in one embodiment, the calculation module of the UE calculates the paging locations according to the extended paging cycle (step 402). Then, the UE monitors the paging signals according to the cell-specific paging cycle multiplied by the coefficient (step 403).

Wrap Around Length Extension for SFN

Since the paging cycle is restricted by the wrap around length of the SFN, the extension level of the paging cycle is determined according to the wrap around length of the SFN. In order to maintain the flexibility of the paging cycle extension, the wrap around length of the SFN can be extended with the extension of the paging cycle T. In one embodiment, the extended wrap around length of the SFN for all MTC UEs can be the same to indicate the location of the SFN in a new wrap around length easily. Similarly, in order to support backward compatibility, the wrap around length of the SFN for MTC UEs may be extended from the wrap around length for normal UEs directly. After the SFN extension, more bits are assigned to indicate the SFN for the MTC UE. The SFN number with more than 10 bits is used to calculate the paging locations for the MTC UE. In order to support backward compatibility, the last 10 bits are used for normal UEs, and can be wrapped around every 1024 number. The SFN boundary for the MTC UE may be long enough for the paging cycle extension for all MTC UEs, wherein the total length is restricted by the maximum SFN number.

The procedure for the wrap around length extension of the SFN is described as follows. At the network side, the MME generates a coefficient which is used for the SFN extension, and forwards the coefficient to the eNB after generating. The coefficient should be large enough for the extension of the paging cycle. After obtaining the coefficient, the eNB broadcasts the coefficient in the SI to all UEs. At the UE side, the UE detects the SI to obtain the coefficient. Normal UEs ignore the coefficient, and MTC UEs use the coefficient to extend the wrap around length of the SFN. After that, the network and the UE use the SFN with the wrap around length of the normal length multiplied by the coefficient to calculate the paging location. It should be noted that the coefficient may not be smaller than the maximum time of the paging cycle extension for MTC UEs. In order to save scarce resources and reduce implementation complexity of the network and the UE, the coefficient for the SFN extension can be the same as the coefficient for the paging cycle extension if the method of the cell-specific paging cycle extension is used for the paging cycle extension through the coefficient in the SI described above.

Like the paging cycle extension, the coefficient for the MTC UEs can also not be transmitted in the SI in the method. The coefficient can be pre-defined in the specifications. During the implementation of the wrap around length extension of the SFN for the MTC UEs, the coefficient can be written by hardware in the network and the MTC UEs.

SFN Boundary Extension

After the wrap around length extension of the SFN, the serial number for MTC UEs should be different from the serial number for normal UEs. The wrap around length of the SFN for MTC UEs is several times the wrap around length of the SFN for normal UEs. Thus, in order to indicate the locations of the paging frame in a radio frame sequence, the boundary and the sequence number of the SFN should be synchronized in the network and the UE. In the embodiment, the SFN boundary for the MTC in a longer wrap around of the SFN is indicated in the SI. The procedure is described as follows. At the network side, the MME and the eNB indicate the SFN boundary according to the wrap around length extension of the SFN. Then, the eNB broadcasts the SFN boundary in the SI to all UEs. At the UE side, the UE detects the SI to obtain the serial number of the SFN. The serial number of the SFN for MTC UEs has more bits than the serial number of the SFN for normal UEs. Normal UEs only detect the last 10 bits of the serial number of the SFN, and ignore the first several bits. The MTC UEs detect all the bits to indicate the serial number of the SFN, wherein the serial number of the SFN is used to calculate the paging frame and the paging occasion.

Figure 5:
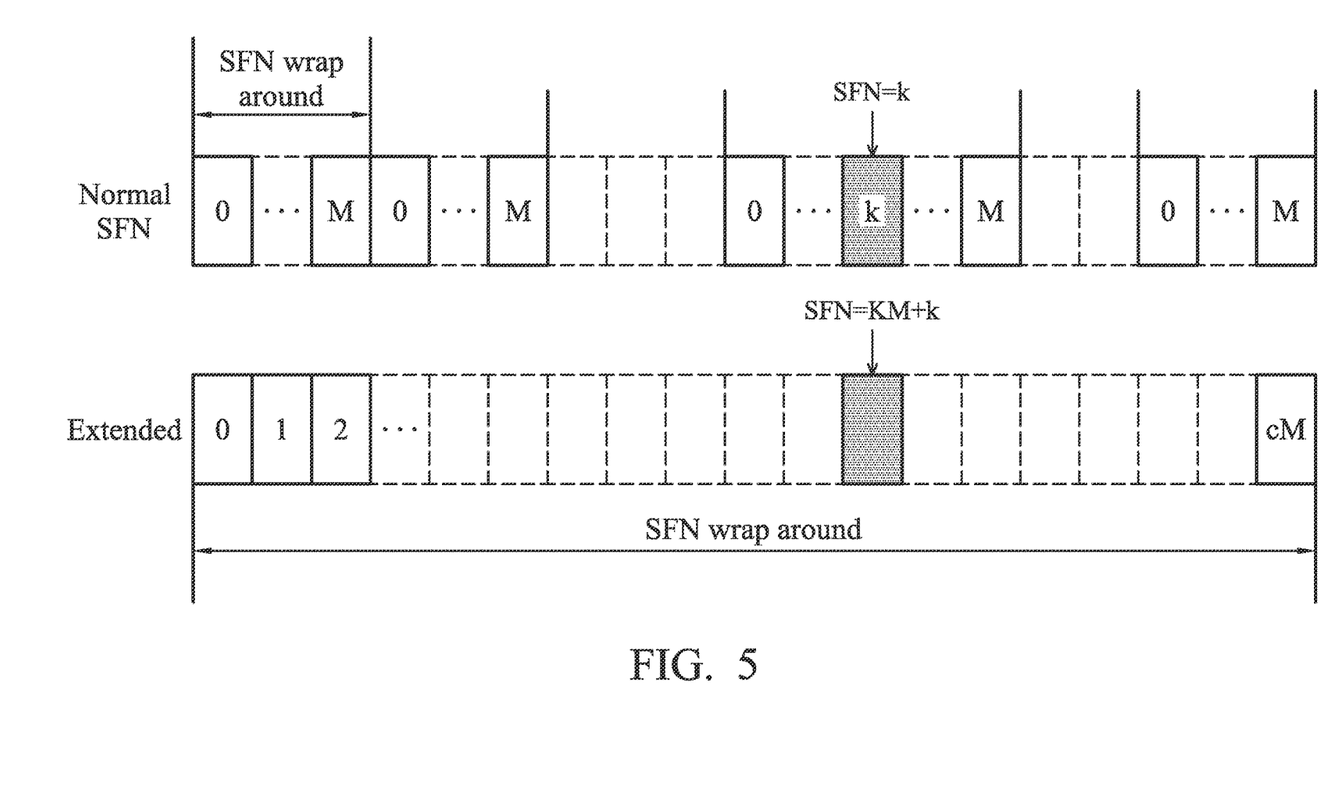
FIG. 5 is a schematic diagram illustrating the SFN extension according to an embodiment of the present invention.

FIG. 5 is a schematic diagram illustrating the SFN extension according to an embodiment of the present invention. In FIG. 5, the SFN is extended by c times. As described above, the coefficient for the SFN extension is c. In the normal SFN, the serial number of the SFN of the $k^{th}$ frame in the $(K+1)^{th}$ wrap around is k. After the SFN extension, the serial number of the SFN of the $k^{th}$ frame is not k, but it can be KM+k, wherein the serial number of the SFN is indicated in the SI through the SFN boundary extension as mentioned above. At the mobile terminal side, the coefficient c and the SFN boundary are obtained from the SI. Then, the extended serial number of the SFN and the extended paging cycle are used to calculate the paging locations. Referring to FIG. 5, the details are described briefly below. For example, there is one paging location, e.g., k, within a paging cycle before the SFN coefficient is extended. After the SFN coefficient is extended, the actual length of the paging period can be the length of the paging period M which is not extended by c times, e.g., cM, and the paging location within the paging cycle may be KM+k. Finally, the network and the mobile terminal generate and monitor the paging signals in the paging locations, respectively.

UE_ID Extension

In the current mechanism, the range of a terminal identifier for normal terminals is 0~1023. For example, a UE_ID of the UE has 10 bits. Paging messages for 1024 groups of UEs are distributed in the wrap round length of the SFN. The UE_ID is a factor that determines the location of paging frames and paging occasions in a paging cycle. A different range of the UE_ID may cause different paging loads in each subframe. After the paging cycle extension and the SFN extension, the paging frames can be distributed in the paging cycle, and the paging occasions can be distributed in the paging frame. In order to make the paging frames be uniformly distributed in the DRX cycle and make the paging occasions be uniformly distributed in the paging subframes which are used for paging, the UE_ID for MTC should be extended with the paging cycle extension. A method for extending the UE_ID for MTC UEs is proposed in the invention.

The method is used to extend the length of the bits for UE_ID according to an embodiment in the invention. More bits for the UE_ID can indicate more UE groups. The UE_ID for MTC UEs is a IMSI modulo (Mod) (1024 multiplied a coefficient). As a result, the UE_ID can have a broader range, so that the paging frames and the paging occasions can be distributed more discretely. The range of the extended UE_ID can make the paging locations be matched with the extended paging cycle. The paging messages for MTC UEs are distributed in the wrap round length of the SFN. In one embodiment of the invention, how many bits to be extended for the UE_ID is determined by how long the paging cycle is extended and what the number of MTC UEs is. One target of the method is to avoid a situation in which a high paging load occurs in some paging frames or subframes.

For the UE_ID extension, the behaviors of the network and the UEs may change the calculation results of the UE_ID for the MTC. The procedure is described as follows. In a proposed method of an embodiment, more UE groups can be defined. At the network side, the MME generates a coefficient which is used for the UE_ID extension for MTC UEs, and forwards the coefficient to the eNBs after generating the coefficient. The coefficient should be large enough for the paging cycle extension. After obtaining the coefficient, the eNB broadcasts the coefficient in the SI to all the UEs. At the UE side, the UE detects the SI to obtain the coefficient. Normal UEs ignore the coefficient, and MTC UEs use the coefficient to extend the UE_ID. During the calculation of the paging frame and the paging occasion at the network and the UEs, the calculation of the IMSI modulo (Mod) 1024 for the UE_ID in the original operation can be disabled. The UE_ID for MTC UEs is the IMSI modulo (Mod) 1024 multiplied by the coefficient. Then, the network and the UEs use the extended UE_ID to calculate the paging location. In order to save scarce resources and reduce the implementation complexity of the network and the UE, the coefficient for the UE_ID extension can be the same as the coefficient for the SFN extension described above.

Similarly, in the UE_ID extension, the coefficient for the MTC UEs can also not be transmitted in the SI. The coefficient can be pre-defined in the specifications. During the implementation of the UE_ID extension for the MTC UEs, the coefficient can be written by hardware in the network and the MTC UEs.

In a proposed method of another embodiment, in the UE side, the MTC UE may generate a coefficient for the UE_ID extension, and reports the coefficient to the eNB. The coefficient should be large enough for the paging cycle extension. After obtaining the coefficient, the eNB reports the coefficient to the MME. In the network side, after the MME obtains the coefficient, the MME stores the coefficient in the UE context.

Some embodiments of the UE_ID extension are described as follows. If the paging cycle and the SFN are both extended by c=10 times, the paging frames and the paging occasions are concentrated in front several frames and subframes, respectively, before the UE_ID extension. Many locations for the paging signal are not used if the UE_ID is not extended. After the UE_ID extension, the paging frames and the paging occasions are uniformly distributed in the paging locations. In one case, the IMSIs for two mobile terminals are 147 and 2195. Both Tc and Tue are 256, nB is T/4, and Ns=1. According to the method for calculating the paging location, even without the UE_ID extension, the paging locations for the two mobile terminals are the same, (PF=76, PO=9). If the UE_ID is extended by using the method described above, the paging locations for the two mobile terminals are (PF=76, PO=9) and (PF=1100, PO=0). It shows that more paging locations can be used after the UE_ID extension.

In one embodiment of the invention, how long the paging cycle can be extended is determined by the actual application requirements. Meanwhile, how long the SFN can be extended is determined by the level of the paging cycle extension. Therefore, the methods proposed in the invention can flexibly adjust the level of the paging cycle extension and the SFN extension.

Figure 6:
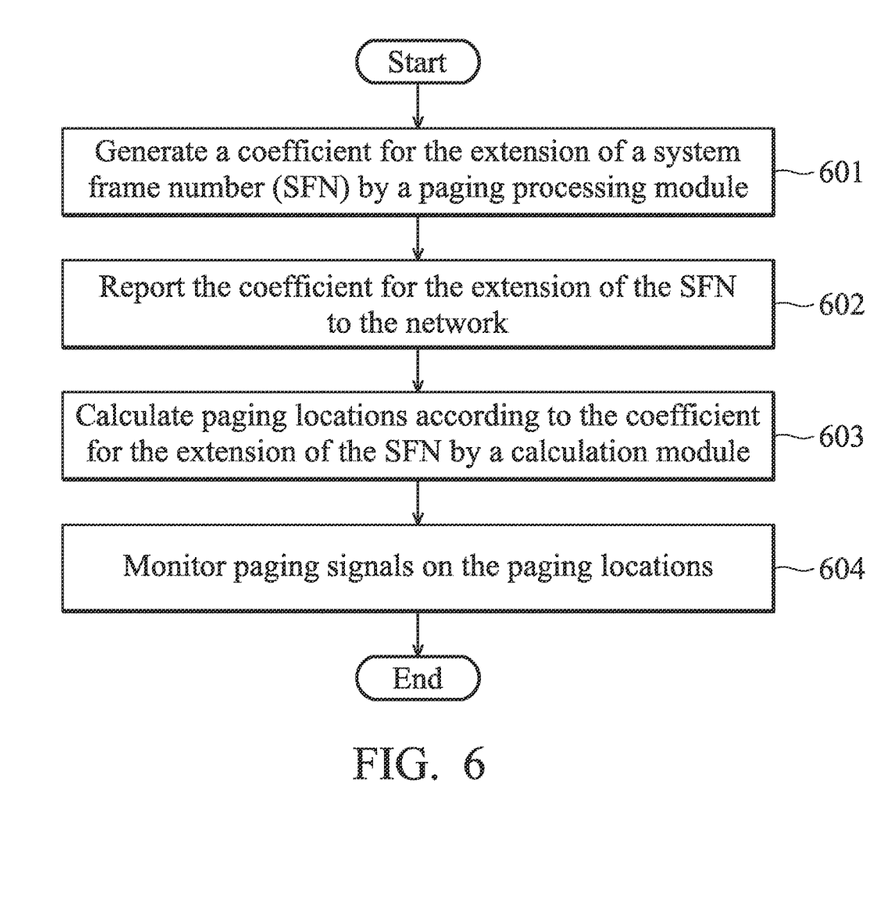
FIG. 6 is a schematic diagram illustrating a procedure of the paging cycle extension performed by the UE according to an embodiment of the present invention.

FIG. 6 is a schematic diagram illustrating a procedure of the paging cycle extension performed by the UE according to an embodiment of the present invention. As shown in FIG. 6, the paging cycle for the MTC UEs is extended through the method of the UE-specific paging cycle. At the UE side, the MTC UE generates a coefficient for the extension of a system frame number (SFN) by a paging processing module (step 601). Then, the UE reports the coefficient for the extension of the SFN to the network (step 602). The UE calculates paging locations according to the coefficient for the extension of the SFN by a calculation module (step 603). Next, in an IDLE mode, the paging processing module of the UE monitors paging signals on the paging locations (step 604). Alternatively, the UE can detect the coefficient for the extension of the SFN in the system information transmitted from the network. Then, the UE may obtain the extended SFN cycle according to the coefficient through the calculation module, and monitor the paging signals on the paging locations after calculating the paging locations.

Figure 7:
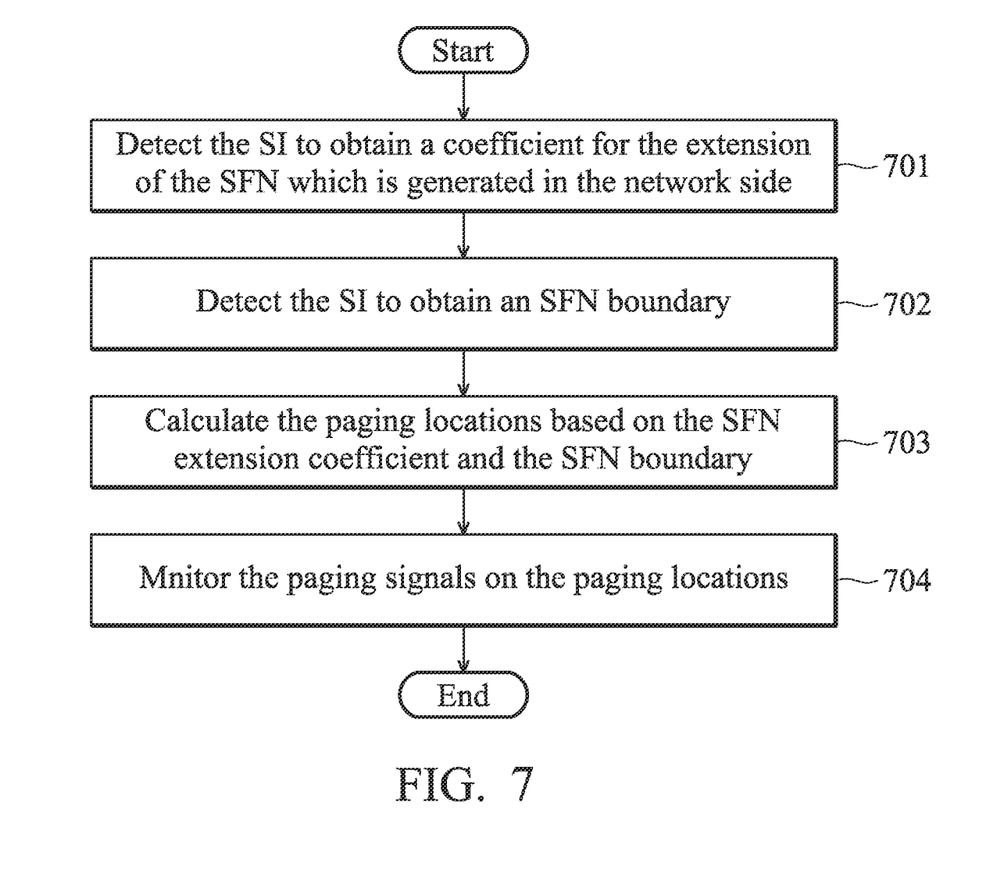
FIG. 7 is a schematic diagram illustrating a procedure of the paging cycle extension performed by the UE according to an embodiment of the present invention.

FIG. 7 is a schematic diagram illustrating a procedure of the paging cycle extension performed by the UE according to an embodiment of the present invention. As shown in FIG. 7, the paging cycle for the MTC UEs is extended through the method of the UE-specific paging cycle. At the UE side, the MTC UE detects the SI to obtain a coefficient for the extension of the SFN which is generated in the network side (step 701). Then, the MTC UE detects the SI to obtain an SFN boundary (step 702). According to the coefficient for the extension of the SFN and the SFN boundary, the MTC UE calculates the paging locations (step 703). Next, in the IDLE mode, the MTC UE monitors the paging signals on the paging locations (step 704). In one embodiment, the MTC UE can further detect the coefficient for the extension of the UE_ID from the SI. Then, the MTC UE can calculate the paging locations according to the coefficient for the extension of the UE_ID, and detects the paging signals on the paging locations. Those skilled in the art will appreciate that the coefficient for the extension of the UE_ID and the coefficient for the extension of the SFN can be the same.

Various aspects of the disclosure have been described above. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skill in the art will appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for monitoring paging signals performed by a mobile terminal of a wireless communications system in an IDLE mode, comprising:
    extending a system frame number (SFN) cycle according to a coefficient for extension of the SFN;
    extending an identification (ID) of the mobile terminal according to a coefficient for extension of the ID of the mobile terminal to obtain an extended ID of the mobile terminal;
    calculating paging locations according to the extended SFN cycle and the extended terminal identification; and
    monitoring paging signals on the paging locations;
    wherein extending the ID of the mobile terminal comprising detecting the coefficient for extension of an ID of the mobile terminal;
    wherein the extended ID of the mobile terminal is a current ID of the mobile terminal multiplied by the coefficient for the extension of the ID of the mobile terminal;
    wherein the coefficient for extension of the SFN and the coefficient for the extension of the ID of the mobile terminal are the same.

2. The method for monitoring paging signals as claimed in claim 1, further comprising:
    generating the coefficient for the extension of the SFN through the terminal; and
    reporting the coefficient for the extension of the SFN to a network.

3. The method for monitoring paging signals as claimed in claim 1, further comprising:
    receiving the system information; and
    detecting the coefficient for the extension of the SFN from the system information.

4. The method for monitoring paging signals as claimed in claim 1, further comprising:
    receiving the system information; and
    detecting the coefficient for the extension of the SFN from the system information.

5. The method for monitoring paging signals as claimed in claim 1, wherein the step of calculating the paging locations according to an extended SFN further comprises:
    detecting an SFN boundary from the system information; and
    calculating the paging locations based on the SFN cycle and the SFN boundary.

6. The method for monitoring paging signals as claimed in claim 2, further comprising:
    triggering Non-Access Stratum (NAS) procedure by the terminal after the terminal generates the coefficient for the extension of the SFN; and
    reporting the coefficient for the extension of the SFN to a mobility management entity (MME) by the NAS through a tracking area update (TAU) procedure,
    wherein the MME further transmits the coefficient for the extension of the SFN to a base station.

7. A method for monitoring paging signals performed by a mobile terminal of a wireless communications system in an IDLE mode, comprising:
    obtaining a serial number of a system frame number (SFN) according to system information;
    obtaining an SFN boundary according to the system information;
    extending an identification (ID) of the mobile terminal according to a coefficient for extension of the ID of the mobile terminal to obtain an extended ID of the mobile terminal;
    calculating paging locations according to the serial number of the SFN, the SFN boundary and the extended ID of the mobile terminal; and
    monitoring paging signals on the paging locations;
    wherein extending the ID of the mobile terminal comprising detecting the coefficient for extension of an ID of the mobile terminal;
    wherein the extended ID of the mobile terminal is a current ID of the mobile terminal multiplied by the coefficient for the extension of the ID of the mobile terminal;
    wherein a coefficient for extension of the SFN and the coefficient for the extension of the ID of the mobile terminal are the same.

8. A device for monitoring paging signals for a mobile terminal of a wireless communication system in an IDLE mode, comprising:
    a detecting circuit, detecting a coefficient for extension of an identification (ID) of the mobile terminal from the system information;
    a calculation circuit, calculating a system frame number (SFN) cycle according to a coefficient for extension of the SFN, extending the ID of the mobile terminal to obtain an extended ID of the mobile terminal by using the coefficient for extension of the ID of the mobile terminal, and calculating paging locations according to the extended SFN cycle and the extended ID of the mobile terminal; and
    a paging processing circuit, monitoring paging signals on the paging locations;
    wherein the extended ID of the mobile terminal is a current ID of the mobile terminal multiplied by the coefficient for the extension of the ID of the mobile terminal;

wherein the coefficient for extension of the SFN and the coefficient for the extension of the ID of the mobile terminal are the same.

9. The device for monitoring paging signals as claimed in claim 8, wherein the paging processing circuit generates the coefficient for the extension of the SFN; and the terminals reports the coefficient for the extension of the SFN to a network.

10. The device for monitoring paging signals as claimed in claim 8, further comprising:
   a transceiver circuit, receiving the system information; and
   a detecting circuit, detecting the coefficient for the extension of the SFN from the system information.

11. The device for monitoring paging signals as claimed in claim 8, wherein the step of calculating the paging locations according to the extended SFN cycle by the calculation circuit further comprises:
   the calculation circuit multiplies the coefficient for the extension of the SFN with the SFN cycle to obtain the extended SFN cycle.

12. The device for monitoring paging signals as claimed in claim 8, wherein the step of calculating the paging locations according to the extended SFN cycle by the calculation circuit further comprises:
   the detecting circuit detects an SFN boundary from the system information; and
   the calculation circuit calculates the paging locations based on the SFN cycle and the SFN boundary.

13. The device for monitoring paging signals as claimed in claim 9, further performs the steps comprising:
   the terminal triggers Non-Access Stratum (NAS) procedure after the terminal generates the coefficient for the extension of the SFN; and
   the transceiver circuit reports the coefficient for the extension of the SFN to a mobility management entity (MME) by the NAS through a tracking area update (TAU) procedure,
   wherein the MME further transmits the coefficient for the extension of the SFN to a base station.

\* \* \* \* \*